United States Patent

Moo et al.

[11] Patent Number: 5,673,957
[45] Date of Patent: Oct. 7, 1997

[54] AUXILARY SUN VISOR

[76] Inventors: Hing Fai Moo; Hing Wing Moo, both of 78-15 269th St., New Hyde Park, N.Y. 11040

[21] Appl. No.: 595,308

[22] Filed: Feb. 1, 1996

[51] Int. Cl.[6] ............................................. B60J 3/00
[52] U.S. Cl. ............................................ 296/97.6
[58] Field of Search ........................ 296/97.2, 97.6, 296/97.9, 97.12, 97.13; 16/376

[56] References Cited

U.S. PATENT DOCUMENTS

| | | | |
|---|---|---|---|
| 975,097 | 11/1910 | Wright | 16/330 |
| 3,304,118 | 2/1967 | Jonas | 296/97 |
| 3,534,999 | 10/1970 | Kesselring | 296/97 |
| 4,167,287 | 9/1979 | Franklin et al. | 296/97 R |
| 4,364,598 | 12/1982 | Viertel | 296/97 K |
| 4,489,974 | 12/1984 | Warhol | 296/97 K |
| 4,526,415 | 7/1985 | Jardine | 296/97 F |
| 5,109,571 | 5/1992 | Ohshima et al. | 16/307 |
| 5,125,131 | 6/1992 | Leblanc | 16/330 |
| 5,398,378 | 3/1995 | Lin | 16/303 |
| 5,408,726 | 4/1995 | Kent | 16/326 |
| 5,427,427 | 6/1995 | Holter | 296/97.6 |

Primary Examiner—David M. Mitchell
Assistant Examiner—Jonathan J. Yun
Attorney, Agent, or Firm—Bauer & Schaffer

[57] ABSTRACT

An auxiliary sun visor formed of a transparent polarized shield is removably attached to conventional vehicle sun visor in a manner allowing it to be pivoted without simultaneous movement of the conventional sun visor.

3 Claims, 3 Drawing Sheets ic
AUXILARY SUN VISOR

FIELD OF THE INVENTION

This invention relates to sun visors for motor vehicles and/or boats and, more particularly, to a novel and improved accessory polarized sun shield which is adapted for releasable attachment to and independent function of the sun visor of a motor vehicle and/or boats.

BACKGROUND OF THE INVENTION

Sun visors in motor vehicles are well known. Standard, original equipment sun visors are generally flat, rectangular opaque panels which are pivotally mounted to a vehicle's interior windshield headliner. A conventional sun visor may be rotated down by the driver or occupant to block windshield glare, or pivoted laterally to alleviate glare through the driver's side window. In both cases, sufficient blockage of the sun is seldom afforded, as the occupants eyes must be shifted to a sightline beneath the visor, resulting in additional glare and hampered visibility. Further, the activation of the original equipment sun visor is both cumbersome and, in many instances, dangerous for the driver and surrounding traffic. As visibility is reduced by the sun's rays, the driver is forced to divert his eyes from the road, to forcefully pull the visor from its retaining mount, and to rotate it downwardly across his sightline, the opaque visor obscuring his view. The driver must then shift his posture so as to utilize the reduced windshield dimension.

It has been known to provide auxiliary visors to enlarge the visible area not blocked by the conventional visor. One such attempt is disclosed in U.S. Pat. No. 4,792,176 to F. Karford, where auxiliary panels are deployed to block the sun's rays in the space between sun visors mounted on the driver's side and passenger's side, as well as to substantially alleviate or reduce the sun's glare in that area beneath the sun visor. While the prior art shows a variety of auxiliary glare blocking or reducing means, they can only be deployed after the standard equipment visor is employed.

It is the object of the present invention to provide an improved auxiliary sun visor, which is adapted for releasable attachment to and independent operation of the conventional sun visor of a motor vehicle.

It is also an object of the present invention to provide for a novel and improved sun visor for motor vehicles, which is mountable on existing sun visors of the vehicle.

An object of the present invention is to provide a novel and improved sun visor, which is independently operable of the existing sun visor of the vehicle.

It is another object of the present invention to provide for a sun visor as an accessory to original sun visors which is compact, durable and lightweight, and will not interfere with normal use of the sun visor when attached thereto.

It is a further object of the present invention to provide a tactile and incremental means for deployment of the sun visor, allowing for minuscule adjustments to the angle of the sun visor upon deployment.

It is one more object of the present invention to provide a sun visor with dual, independently actuated and functioning polarized sun shields, wherein the shields may be of similar gradient and tint, or of dissimilar tints to enhance vision in a variety of weather conditions.

SUMMARY OF THE INVENTION

In accordance with the present invention, an auxiliary sun visor is provided for a vehicle having a primary opaque sun visor. Preferably, the auxiliary sun visor is transparent and polarized. The auxiliary visor is attached directly to the free edge of the primary visor by a clip so that it may be easily removable. The clip includes a hinge by which the auxiliary visor is held and is thus pivotable to the primary visor without movement or deployment of the primary visor.

BRIEF DESCRIPTION OF THE DRAWINGS

Other objects, advantages and features of the present invention will become more readily appreciated and understood when taken together with the following detailed description in conjunction with the accompanying drawings, in which.

DETAILED DESCRIPTION OF THE INVENTION

Figure 1:
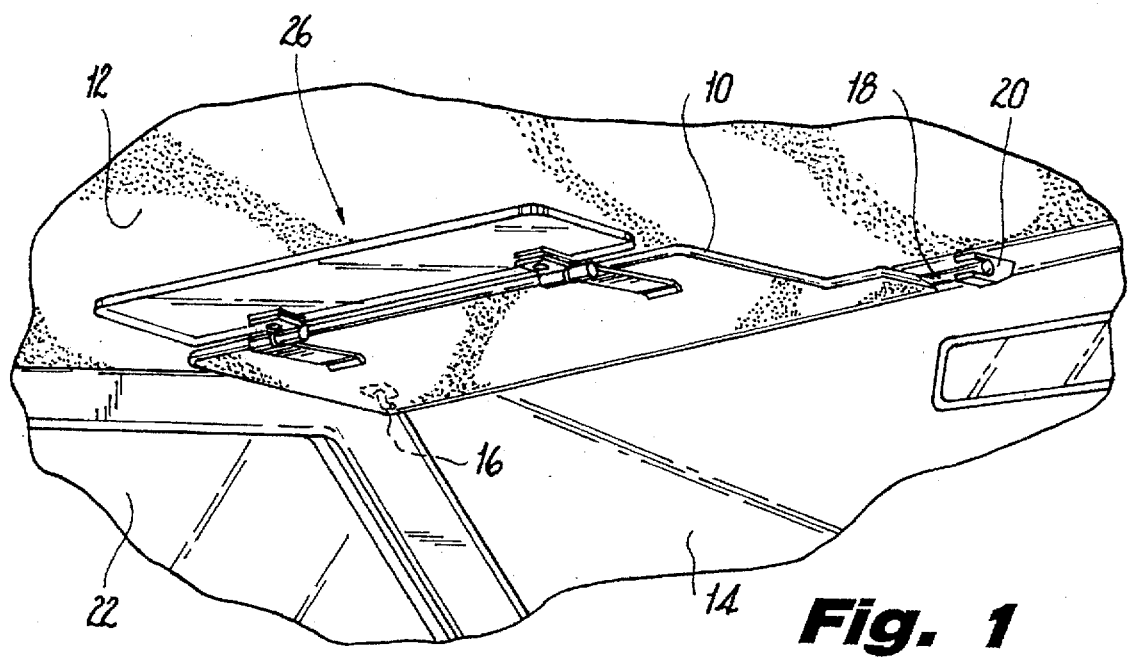
FIG. 1 is an underside perspective view illustrating the preferred embodiment of the sun visor of the present invention, in attached relation to a conventional sun visor of a motor vehicle.

Referring now to FIG. 1, there is shown by way of illustrative example a conventional motor vehicle opaque sun visor 10, retractably positioned parallel to the headliner 12, adjacent the top of the windshield 14. Visor 10 is fixed at its left edge by right angle extension 16 (shown in phantom) to the headliner 12, and is releasably held at its other end by a pivot rod 18, which frictionally fits into biparte spring bracket 20. Visor 10 is capable of rotating downwardly in an approximate 120° arc from this retracted position. Upon release of rod 18 from bracket 20, the visor 10 is free to pivot laterally on right angle extension 16. This, combined with a downward pivot, provides for blockage of side window 22.

This pivoting action of visor 10 around rod 18 causes momentary blockage of the driver's sightline. Upon desired positioning of visor 10, the area below the visor still allows for a passage of the sun's rays, causing reduced visibility as the driver is forced to shift his posture to compensate for a lowered sightline. Lateral glare from a setting sun's rays are both annoying and dangerous for a motor vehicle operator. To sufficiently block side window 22, dangerous and awkward maneuvers of the driver's head and body are necessary to position visor 10. Upon positioning, the sightline through side window 22 will be completely obscured, due to the dimensional width of the visor. Manipulation of visor 10 or additional head, neck, and shoulder contortion will be necessary to allow for the utilization of side window 22.

Referring still to FIG. 1, there is shown one form of the present invention seen generally as numeral 26, secured to visor 10 and retracted relatively parallel to headliner 12.

Figure 2:
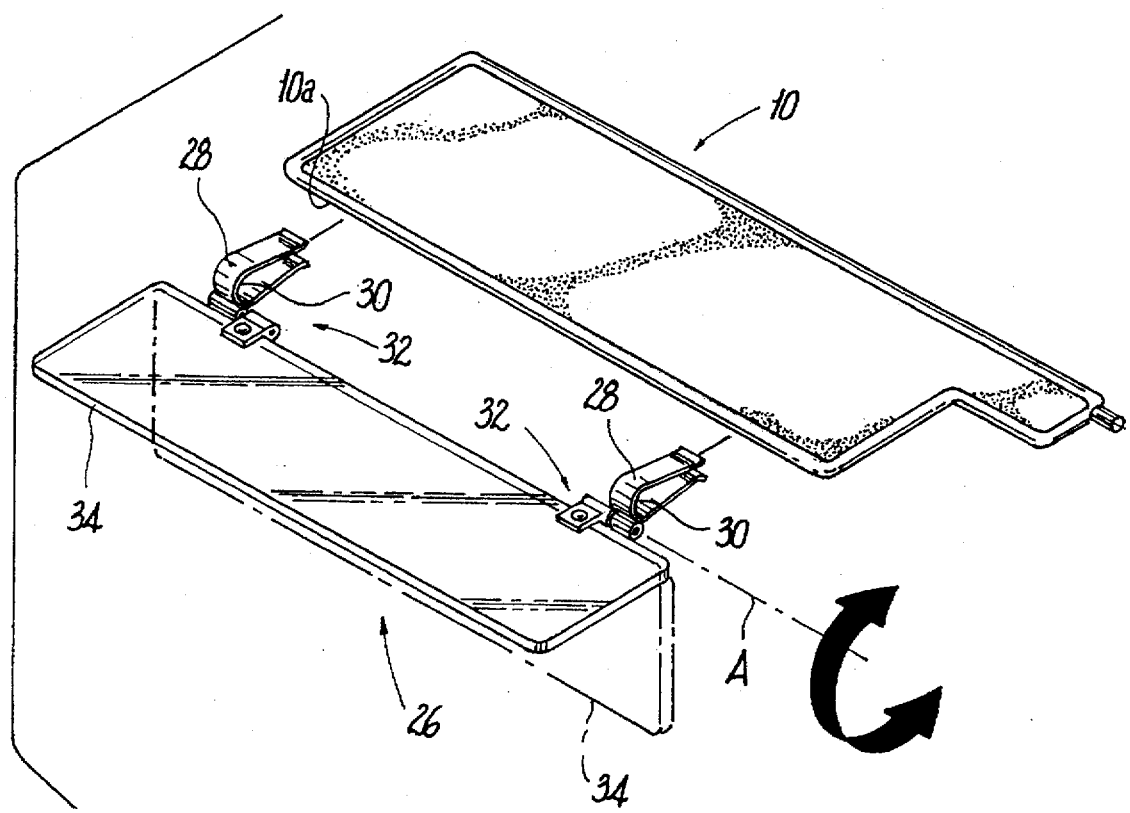
FIG. 2 is a top-side view in perspective of the sun visor seen in FIG. 1, the visor being shown unattached to a conventional visor and a deployed position illustrated in dotted form.

As seen in detail in FIG. 2, the auxiliary sun visor 26 comprises a polarized transparent shield 34 which is releasably secured to the conventional visor 10 by elongated clips 28. The legs of clips 28 are of sufficient length to extend over a substantial portion of the top and bottom surfaces of visor 10, and of sufficient bias to insure a tight, frictional attachment to visor 10 when the arcuate web portion 30 abuts the leading edge 10a of visor 10. The elongated clips 28 are permanently mounted to the shield 34 by hinge fixtures, generally depicted by reference numeral 32, which allow for rotation of polarized visor shield 34 from the retracted position shown in solid line, about axis "A" to a 90° deployed position shown in dotted line. Continued rotation about axis "A" would yield an additional 90° of pivot; the polarized visor shield is therefore capable of over 180° of rotation, from a retracted position parallel to headliner 12, to a retracted position parallel the underside of visor 10. During the pivoting action of the polarized visor shield to a desired setting, vision is never obscured due to the transparency of the shield.

Figure 3:
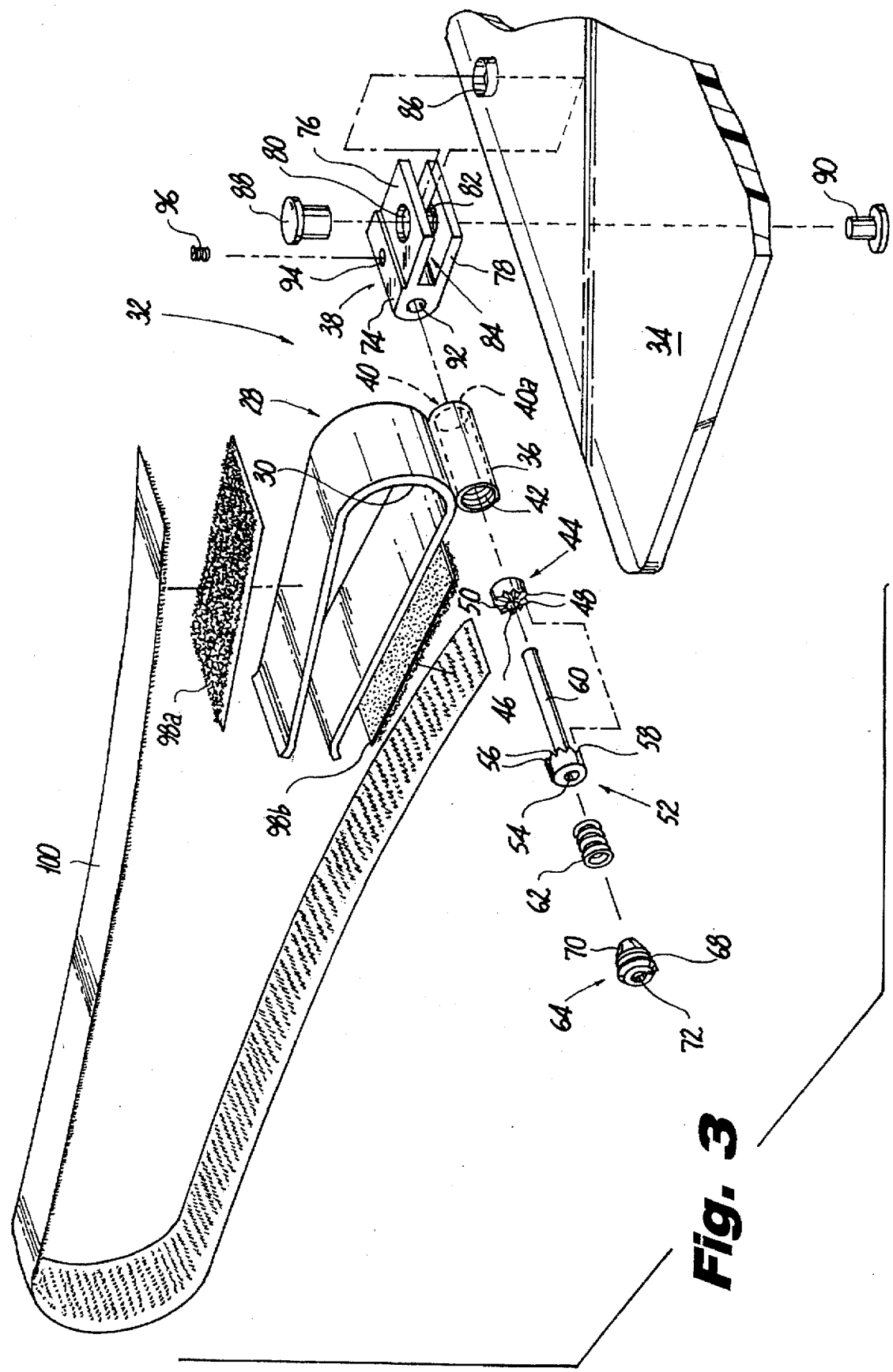
FIG. 3 is a fragmentary view, in perspective, of one hinge unit shown in FIG. 2, with parts separated.

As seen in FIG. 3, the hinge fixture 32 comprises a tubular member 36 and a mounting clip 38. Tubular member 36 is permanently fixed to the elongated clips 28 by a known means such as welding, bonding or the like and is formed with a through bore 40 having a tapped interior portion 42. A first cylindrical member comprising a disc 44 is inserted into the tapped portion 42 and permanently fixed to the interior of the tubular member 36 at its far end, using known means. The disc 44 is provided with through bore 46, and a plurality of teeth 48 on a serrated but exposed face 50.

A second cylindrical member comprising a disc 52 is formed in a similar fashion to that of disc 44—namely, with a through bore 54 and a plurality teeth 56 on a serrated face 58. As will be discussed below, the teeth 56 will intermesh with the teeth 48 of disc 44.

The through-bore 54 of the disc 52 of the second cylindrical member accepts a pin 60, which is permanently fastened within disc 52 using conventional means. The resulting integral member is now inserted into tapped portion 42 of tubular member 36, so as to allow pin 60 to pass into through-bore 46 of disc 44, which has been permanently secured within tubular member 36 as described previously. The serrated face 58 of the disc 52 is thus made to rest in contact with the serrated face 50 of the disc 44 so that teeth 56 intermesh with teeth 48.

A small coil spring 62 is placed into tapped portion 42 of tubular member 36. The coils of spring 62 are in smaller overall diameter than through-bore 40 of tubular member 36. Spring 62 abuts disc 52 and serves to bias the serrated faces of the two discs together, resulting in a constant meshing of the teeth. Cap 64, which comprises a threaded portion 68, a blunt conical nose 70, and a head 72, is threaded into tapped portion 42 of tubular member 36 utilizing a common Allen wrench or screw driver, fitted into recess 72. When installed, blunt conical nose 70 of cap 64 compresses coiled spring 62, creating the biasing force against disc 52, insuring a constant meshing of teeth 56 and 58.

Mounting clip 38 comprises a body 74, with a pair of laterally depending legs 76 and 78. Depending leg 76 is provided with a through-hole 80, and depending leg 78 is provided with through-hole 82. These through-holes share a common centerline, providing for proper alignment. The space 84 between legs 76 and 78 is dimensioned to frictionally receive the polarized sun shield 34. Through-holes 86 are provided in shield 34 so that upon installation of the shield between legs 76 and 78 of mounting clip 38, through-hole 86 is in alignment with hole 80 of leg 76 and hole 82 of leg 78. This assembly may now be permanently fixed together using an upper snap rivet 88, and a lower rivet 90. The heads of rivets 88 and 90 will compress against leg 76 and 78 respectively, resulting in permanent fixture of shield 34 within notch 84.

The body 74 of the mounting clip 38 is formed with a through bore 92, the diameter of which is slightly larger in dimension than pin 60, which after assembly protrudes from tubular member 36 in a lateral orientation so as to be inserted into bore 92. It is desirable that the pin 60 not be so large as to extend out of body 74. As a result, a small gap will exist when tubular member 36 is finally assembled to mounting clip 38. Body 74 is provided with a small tapped opening 94, which is a through-hole which opens into the bore 92. A set screw 96 is threaded into opening 94 and, upon tightening, will bear against pin 60, securely fixing the pin within bore 92 of body 74.

Referring still to FIG. 3, securement of the inventive polarized sun visor 26 to the conventional visor 10 can be effected by using self-adhesive loop fasteners 98a and 98b, attached to the legs of clip 28, and an elongated fabric strap 100, with integral hooks, attached to loop fastener 98a. Upon installation of clip 28 to visor 10, strap 100 will wrap visor 10 so as to cause added constriction of arcuate portion 30 against the leading edge 10a of the visor. Upon final cinching, strap 100 is secured to loop fastener 98b on the underside leg of clip 28.

Figure 4:
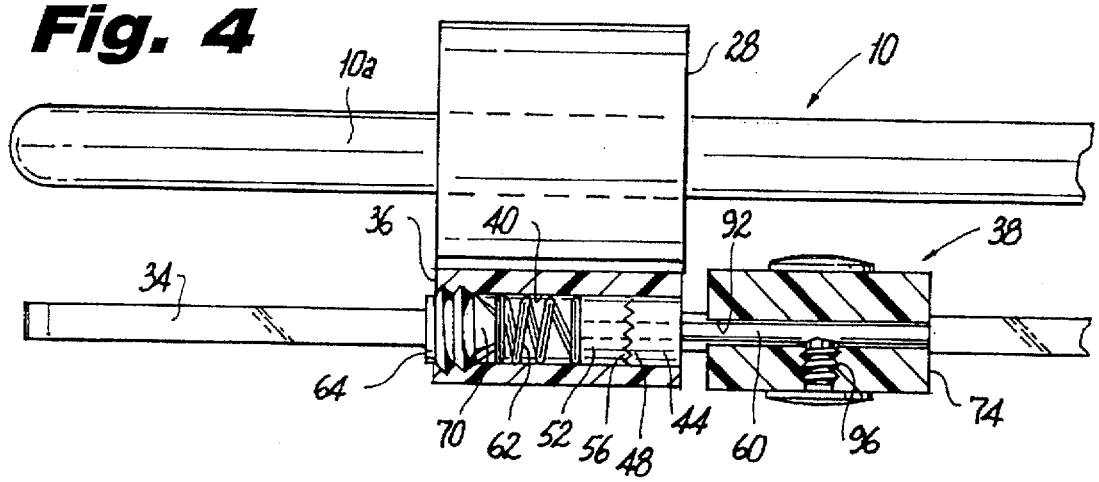
FIG. 4 is an elevational view, in partial section, of the hinge unit attached to the sun visor of a motor vehicle, and the sun visor of the present invention undeployed.
Figure 5:
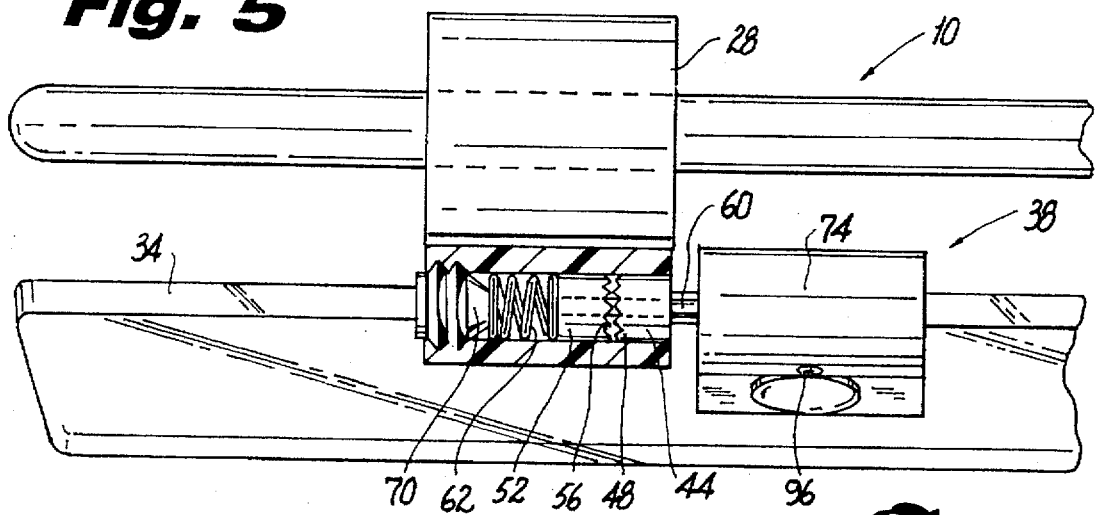
FIG. 5 is an elevational view, in partial section, of the hinge unit shown in FIG. 4, with the sun visor of the present invention partially deployed.

Turning to FIG. 4 and 5, the use and operation of the invention will be described. The polarized visor shield is shown in a retracted position, substantially parallel to the underside of visor 10. In this position, teeth 56 of disc 44 intermesh with teeth 48 of disc 44, which is fixed within bore 40 of tubular member 36. Coil spring 62 compresses disc 52 against disc 44, due to the pressure of blunt conical nose 70 of cap 64. Pin 60 is shown in phantom passing through the bores of discs 52 and 44, and continuing into bore 92 of body 74, where it is fixed by set screw 96.

To deploy shield 34 into his sightline, the operator grasps the shield and exerts a downward force, best seen in FIG. 5. As described previously, mounting clip 38, riveted to shield 34, secures pin 60 within body 74. As the pin rotates in conjunction with mounting clip 38, disc 52 will simultaneously be urged to rotate, being fixedly mounted to pin 60. The teeth 48 of disc 44, which will not rotate being fixed within bore 40 of the tubular member 36, will act as camming surfaces for the teeth 56 of disc 52. This camming action results in serrated face 58 of disc 52 separating, as it rotates, from serrated face 46 of disc 44. This separation causes a compression of spring 62 against nose 70, as the teeth no longer mesh. However, the bias of spring 62 will continually act upon disc 52, forcing teeth 56 to mesh with teeth 48 upon each incremental rotation of disc 52. It is this re-alignment which yields a tactile or "ratchet-like" feel for the operator, while allowing for minuscule angles of adjustment to shield 34. Thus, the auxiliary sun visor is movable from a first position overlying the primary visor into any selected position removed therefrom, without movement of the primary visor, even beyond a range of 180°.

Figure 6:
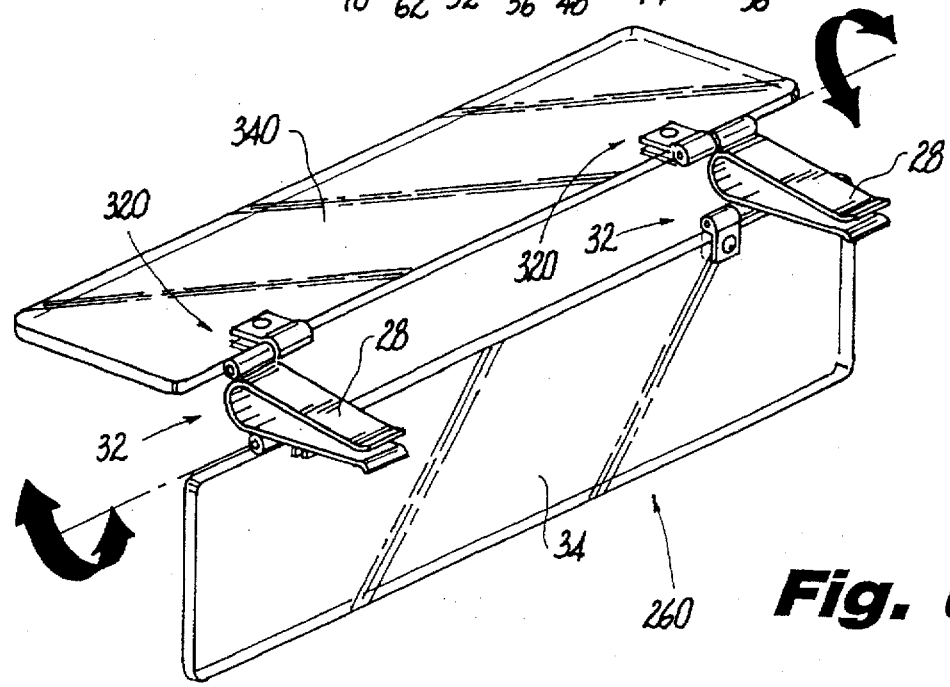
FIG. 6 is a top-side view, in perspective, of an alternate embodiment of a sun visor according to the present invention.

In the embodiment illustrated in FIG. 6, parts similar in structure and function to those shown in the preceding figures bear similar numerals and, unless required, are not further described. In this alternate embodiment, seen generally as reference numeral 260, additional hinge fixtures 320 have been mounted on clips 28, opposite existing hinge fixtures 32. Hinge fixtures 320 secure secondary shield 340, which pivots in a similar manner to shield 34. Shield 340 may be identical in form and function to shield 34; used in concert, the polarized tint of the shields would greatly enhance the glare reduction capability of the visor. It may be more desirable, however, for shield 340 to be of a differing tint gradient than shield 34; shield 340 may also be tinted in a vermillion or yellow color to enhance contrast when motoring during overcast or snowy weather. Still another option would be to offer a blue tinted shield, to reduce eye fatigue during night time motoring.

It is to be understood that many changes and modifications can be made hereto without departing from the spirit and scope hereof.

What is claimed is:

1. An auxiliary sun visor for vehicles having a primary visor pivotally attached by one edge to the interior of the vehicle adjacent the interior roof and having an opposing free edge, said auxiliary sun visor comprising a transparent shield, a first cylindrical member removably attached to said primary visor; a second cylindrical member secured said transparent shield along the free edge thereof in axial alignment with said first cylindrical member; a pin extending at least in part through each of said first and second cylindrical members to permit relative rotation of said cylindrical members; spring means acting on said pin and said first and second cylindrical members to bias said first and second cylindrical members axially toward each other; and ratchet means to limit the relative rotation of said first and second cylindrical members relative to each other in discretely indexed steps through more than 180° from one surface of the visor to the other and may be fixed at any angle therebetween, said ratchet comprising a pair of intermeshing discs having cooperating teeth on their engaging faces, one of said discs being concentrically attached on one end of said pin and the other of said discs being attached to said first cylindrical member, said pin being attached to said second cylindrical member using a set screw whereby said transparent shield is pivotal without simultaneous movement of the primary visor regardless of the initial position of the primary visor.

2. The auxiliary sun visor according to claim 1, wherein said transparent shield is formed of polarized material.

3. The auxiliary sun visor according to claim 1, wherein the means for attaching the transparent shield to the primary visor comprises a spring clip removably attachable to said primary visor and to which said first cylindrical member is fixedly secured.

* * * * *

UNITED STATES PATENT AND TRADEMARK OFFICE
CERTIFICATE OF CORRECTION

PATENT NO. : 5,673,957
DATED : October 7, 1997
INVENTOR(S) : Moo, et. al.

It is certified that error appears in the above-identified patent and that said Letters Patent is hereby corrected as shown below:

Title page, [54], and col. 1, line 1, change "AUXILARY" to--AUXILIARY--.

Column 5, Claim 1, line 21: after "secured" insert --to--.

Signed and Sealed this

Tenth Day of February, 1998

Attest:

BRUCE LEHMAN

*Attesting Officer*     *Commissioner of Patents and Trademarks*